US008224562B2

(12) United States Patent
Katzer

(10) Patent No.: US 8,224,562 B2
(45) Date of Patent: Jul. 17, 2012

(54) METHOD FOR THE AUTOMATIC, COMPUTER-ASSISTED DETERMINATION OF A ROUTE TRAVELABLE BY MOTOR VEHICLES

(75) Inventor: Jochen Katzer, Bergtshofen (DE)

(73) Assignee: Garmin Würzburg GmbH (DE)

( * ) Notice: Subject to any disclaimer, the term of this patent is extended or adjusted under 35 U.S.C. 154(b) by 1069 days.

(21) Appl. No.: 11/762,716

(22) Filed: Jun. 13, 2007

(65) Prior Publication Data

US 2008/0004797 A1    Jan. 3, 2008

(30) Foreign Application Priority Data

Jun. 29, 2006   (EP) ..................................... 06013448

(51) Int. Cl.
*G01C 21/00* (2006.01)

(52) U.S. Cl. ........ 701/201; 701/410; 701/420; 701/424; 701/425; 701/468; 340/995.19; 340/995.22; 340/995.23

(58) Field of Classification Search .......... None
See application file for complete search history.

(56) References Cited

U.S. PATENT DOCUMENTS

| | | | | |
|---|---|---|---|---|
| 5,654,892 A | * | 8/1997 | Fujii et al. ..................... | 701/437 |
| 6,029,173 A | * | 2/2000 | Meek et al. .................... | 707/696 |
| 6,366,927 B1 | * | 4/2002 | Meek et al. .................... | 345/442 |
| 2001/0020902 A1 | * | 9/2001 | Tamura ......................... | 340/905 |
| 2003/0078720 A1 | * | 4/2003 | Adachi .......................... | 701/200 |
| 2004/0049339 A1 | * | 3/2004 | Kober et al. ................... | 701/209 |
| 2005/0187705 A1 | * | 8/2005 | Niwa et al. .................... | 701/208 |
| 2005/0209772 A1 | * | 9/2005 | Yoshikawa et al. ........... | 701/200 |
| 2005/0246096 A1 | * | 11/2005 | Bracht et al. .................. | 701/211 |
| 2006/0015249 A1 | * | 1/2006 | Gieseke ........................ | 701/210 |
| 2007/0038367 A1 | * | 2/2007 | Froeberg ....................... | 701/202 |
| 2009/0018767 A1 | * | 1/2009 | Gehring et al. ............... | 701/202 |

FOREIGN PATENT DOCUMENTS

| | | |
|---|---|---|
| DE | 100 31 787 A1 | 1/2002 |
| WO | WO 2006/042689 A1 | 4/2006 |

OTHER PUBLICATIONS

European Search Report for EP06013448, dated Dec. 4, 2006, 2 pages.

* cited by examiner

*Primary Examiner* — Jonathan M Dager
(74) *Attorney, Agent, or Firm* — Samuel M. Korte; Mohammad M. Ali

(57) ABSTRACT

A method for the automatic, computer-assisted determination of a route travelable by motor vehicles from a starting point to a destination point based on digitalized map data, wherein a computer acquires a starting point and destination point and determines the route based on possible road segments in such a way that the automatically generated route has a high recreational value. To this end, it is proposed that the computer determining the route preferably incorporate those road segments into the route that exhibit a high number of curves.

5 Claims, 2 Drawing Sheets

METHOD FOR THE AUTOMATIC, COMPUTER-ASSISTED DETERMINATION OF A ROUTE TRAVELABLE BY MOTOR VEHICLES

CROSS-REFERENCE TO RELATED APPLICATIONS

The present patent application claims priority from European Patent Application No. EP 06 013 448, filed on Jun. 29, 2006.

BACKGROUND

The invention relates to a method for the automatic, computer-assisted determination of a route travelable by motor vehicles from a starting point to a destination point based on digitalized map data, wherein a computer acquires a starting point and destination point, and determines the route based on possible road segments.

Such methods are sufficiently known. In particular, such methods are commonly used in navigation devices, as well as in satellite navigation devices, e.g., which make use of the GPS.

Known algorithms for determining routes typically draw upon digitalized map data, which exhibit digital forms of individual road segments. The algorithms for determining a route combine the road segments based on various criteria. In a simplest case, the shortest segment-based route is searched for, i.e., the road segments yielding the shortest route to be traveled are selected. Alternatively, algorithms oriented toward the expected time for traveling such a route are today commonly used in determining an optimal route. A route comprised of varying road segments is here selected based on the expected traveling time, and a route having the shortest expected time is computed.

In modern navigation devices, a user can introduce preset options, in which the road segments to be considered for a route must also satisfy various presettable criteria. For example, current navigation systems can often make use of a stipulation that the route be picked without taking into account ferry connections or toll roads.

Taken together, these stipulations yield the fastest possible trip or least expensive trip.

What has not been previously known is to automatically generate routes that incorporate other aspects, in particular have a high recreational value.

Figure 1:
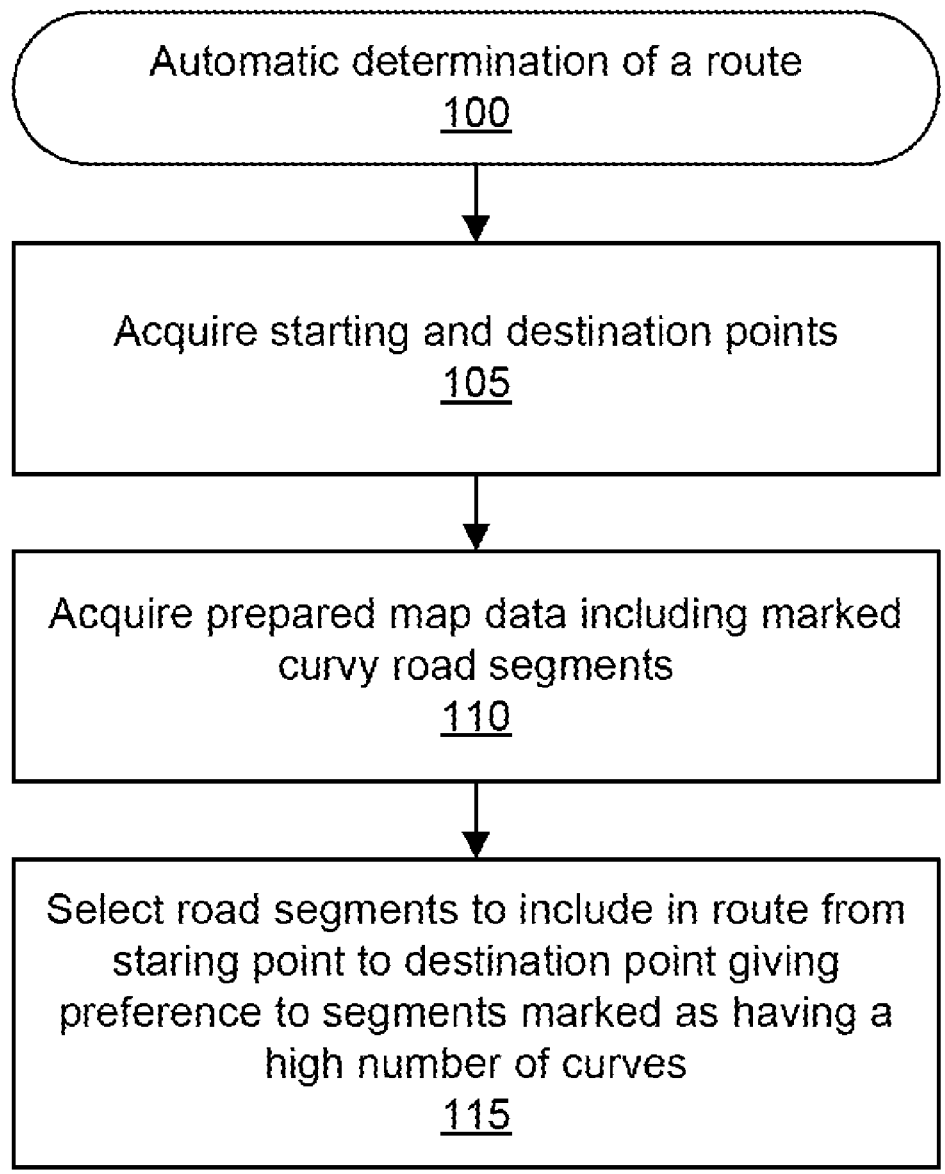
Figure 2:
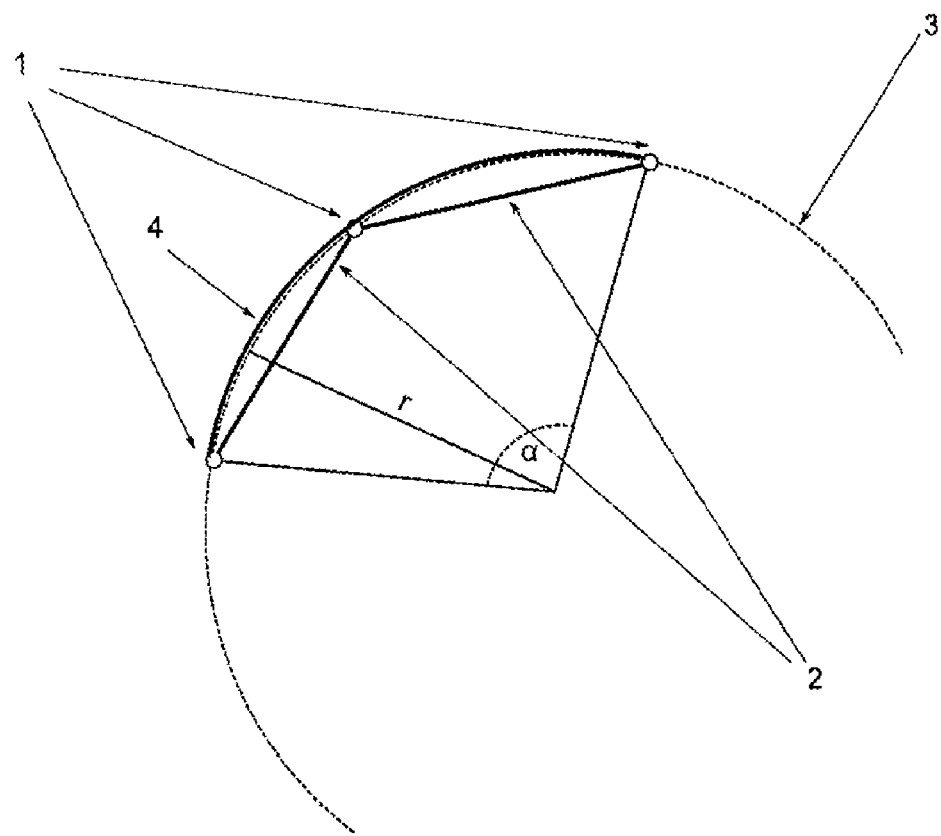

FIG. 1 illustrates an exemplary method for the automatic determination of a route from a starting point to a destination point based on digitalized map data; and FIG. 2 illustrates an exemplary road segment including geometrical parameters for the calculation of curviness according to one embodiment.

DETAILED DESCRIPTION

The invention is intended to remedy this.

This object is achieved according to the invention in that, in a method 100 of the kind mentioned at the outset, the computer determining the route preferably incorporates those road segments into the route that exhibit a high number of curves. At block 105, the computer acquires a starting point and a destination point for the route. At block 110, the computer acquires prepared map data including marked curvy segments. At block 115, the computer selects road segments to include in the route from the starting point to the destination point while giving preference to segments marked as having a high number of curves. In terms of the invention, curves are road segments in which the road follows curves. Curves with a narrower, i.e., smaller radius are here preferred in the invention. Curvy roads are often preferred in particular by those drivers who do not determine the route just based on getting from one location to another as fast or inexpensively as possible, but emphasize the pleasure of driving. This holds true especially for drivers of motorcycles, sports cars or cabriolets, since traveling on curvy roads imparts a sporty driving experience precisely in these motor vehicles, thereby incorporating an "entertainment" or "recreational value."

In other words, the invention makes it possible, for the first time, to select a route based not just on practical and expedient aspects, but also on the driving experience.

In an advantageous further development of the invention, the digital map data are first prepared before a route determination in such a way as to correspondingly mark road segments with a high number of curves, e.g., by allocating a corresponding "curve flag" to these data. When determining the route, the computer then will give preference to the road segments marked in this way, or include them in the route.

The map data can already be prepared during the original setup of a corresponding route determination system, so that the information from the map data already includes noted and marked curvy road segments. As an alternative, but not a preferred one, the map data can be correspondingly prepared as a first step in an ongoing route determination.

Of course, routes with a high recreational value can also essentially be compiled based on other criteria, e.g., the selection of road segments that are scenic, panoramic, or interesting from the standpoint of archaeological history or architecture. Comparable designations can already be found in classic maps, in which scenic roads can be marked green, for example. Even if this invention is specially targeted at the selection of curvy roads, the selection of road segments imbued with such a high recreational value and inclusion of the latter in a route to be determined is also regarded as part of the invention.

One way of automatically determining the curvy road segments 2 as described is illustrated in FIG. 2. The focus is here placed in particular on the curve radius r as well, so that only those road segments 2 are designated as having "a high number of curves" that have corresponding curves with small radii r. In the final analysis, the desired driving feel depends on the experienced transverse accelerations that are simulated in the method described here, taking into account the circular radii r and expected speeds. The greater the transverse accelerations, the more fun the drive, so that a minimum level is here selected for these transverse accelerations, serving as a minimum threshold for defining a road segment 2 as "exhibiting a high number of curves" or "curvy."

In another advantageous further development of the invention, it is preferred that a preset weighting be introduced, based on which the computer gives preference to those road segments 2 with a high number of curves rather than shorter or rapidly travelable road segments 2 during route determination. For example, the curviness can be weighted with a factor of 2, i.e., a road segment 2 with a high number of curves is preferred over a road segment 2 without a lot of curves until it is twice as long or takes twice as long to travel.

In particular when the method according to the invention is used in satellite-assisted navigation, at least the starting point is advantageously acquired by means of a satellite-assisted position acquisition process.

A further aspect of the invention involves a navigation device, in particular for satellite-assisted navigation, which is set up for route determination using one of the method described above.

One possible approach to determining the "curviness" of a specific road segment 2 will be described once again in greater detail below:

In a road segment 2 contained in the map data in digital form with at least three so-called shape points 1, the radius r of a perimeter 3 marked out by three consecutive points 1 is computed, along with the angle α at which the two road segments 2 lying between the outer and middle shape point 1 would be visible from the midpoint of the perimeter 3.

If one were to refer to two such consecutive road segments 2 as a "road wedge" 4, the measure for curviness would be the virtual work necessary to move a mass of 1 kg on the perimeter 3 at a prescribed velocity $v_0$ by the angle α to which the "road wedge" 4 corresponds.

The entire virtual work for traveling a road section is calculated by adding together the virtual work allocated to all "road wedges" 4. While "inner" road segments 2 are each accounted for twice, the resulting error is negligible given a high enough number of shape points 1.

In particular, the bending radius is omitted when calculating the virtual work. As a result, the measure equals the velocity squared ($v_0^2$) times the sum of the angles α of road wedges 4. This procedure enables a very quick and precise calculation.

Basically, this approach can also be generalized for interpolative mathematical curves (e.g., splines), and would yield even better results.

In the procedure described above and generalized as hinted above, it is also possible in particular to distinguish between right and left curves.

Further, the curviness determined with the means described can be used in driver assistance systems to issue a warning if the speed is excessive for an upcoming curve based on the curve data calculated from the digital map data and harmonized with the current motor vehicle position determined with a navigation system, or even intervene actively in vehicle control to reduce speed in time before heading into the curve.

In addition, the travel time can be realistically evaluated by taking into account the maximum possible driving speed along curvy road segments 2, taking a maximum transverse acceleration as the limit.

What is claimed:

1. A method for the automatic, computer-assisted determination of a route travelable by motor vehicles from a starting point to a destination point based on digital map data, the method comprising:

acquiring, by a computer, a starting point and destination point; and determining, by the computer, the route based on possible road segments, wherein the computer determining the route selects road segments to include in the route that exhibit a high number of curves, wherein the digital map data is prepared prior to the route determination and in such a way that road segments having a high number of curves are marked, and the computer preferably selects road segments thusly marked to be included in the route during route determination.

2. The method according to claim 1, wherein the road segments having a high number of curves are determined as follows:

a) Road segments having more than two points (starting and end point) in a vector representation are automatically selected;

b) A computer takes the road segments selected in this way and determines the circles traversing the adjacent points and their radii;

c) A possible transverse acceleration is computed from an automatically determined average velocity possible for these road segments, and this value is defined as a measure of "curviness" for the segment;

d) The value for "curviness" determined in this way is automatically compared with a preset minimum value, and the road segment is designated as curvy when the minimum value is reached or exceeded.

3. The method according to claim 1, wherein when determining the route, the computer takes into account both the overall distance or overall travel time for the route resulting from the various road segments, and a preferred application of road segments with a high number of curves, wherein a weighting is prescribed, based on which the computer integrates those road segments with a high number of curves into the route, even if the road segment is longer or takes more time to travel.

4. The method according to claim 1, wherein the starting point is determined by means of a satellite-assisted position acquisition system.

5. The method according to claim 4, wherein the satellite-assisted position acquisition system is a global positioning system (GPS).

* * * * *